US012644320B2

(12) United States Patent
Choi et al.

(10) Patent No.: US 12,644,320 B2
(45) Date of Patent: Jun. 2, 2026

(54) DUAL GOOSENECK HINGE ASSEMBLY FOR A DOOR COVER

(71) Applicant: GM Global Technology Operations LLC, Detroit, MI (US)

(72) Inventors: Jungman Choi, Incheon (KR); Junghoon Kim, Seoul (KR); Jongseok Yoon, Seoul (KR); Youngjin Kwon, Suwon (KR); Soonbeom Kwon, Seoul (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 18/775,454

(22) Filed: Jul. 17, 2024

(65) Prior Publication Data

US 2026/0022599 A1 Jan. 22, 2026

(51) Int. Cl.

*E05B 83/34* (2014.01)
*E05D 3/10* (2006.01)
*E05D 3/12* (2006.01)

(52) U.S. Cl.

CPC ................ *E05D 3/10* (2013.01); *E05B 83/34* (2013.01); *E05D 3/127* (2013.01); *E05Y 2900/534* (2013.01)

(58) Field of Classification Search

CPC ... E05Y 2900/534; E05D 3/145; E05D 11/06; E05D 11/10; E05D 11/1028; E05D 11/1085; E05D 11/1007; E05D 2005/067; E05D 3/147; E05D 3/127; E05D 3/12; E05D 3/125; E05F 15/63; E05F 15/611; B60K 2015/0515; B60K 2015/053; B60K 15/05

USPC ........... 296/146.11, 97.22; 16/319, 327, 345, 16/348, 335, 352

See application file for complete search history.

(56) References Cited

U.S. PATENT DOCUMENTS 2,116,758 A * 5/1938 Jacobs .................... E05D 3/127 16/379
2,132,266 A * 10/1938 Lefevre .................. E05D 3/022 16/361
2,873,470 A * 2/1959 De Dona ............... E05C 17/16 16/360

(Continued)

FOREIGN PATENT DOCUMENTS

DE 102019134088 A1 * 6/2021 ............. E05D 3/125
WO WO-2014062971 A1 * 4/2014 ............. E05D 11/06

*Primary Examiner* — Emily M Morgan

(74) *Attorney, Agent, or Firm* — Vivacqua Crane, PLLC

(57) ABSTRACT

A dual gooseneck hinge assembly for a door cover that provides access to an opening defined by a body panel includes an outer hinge member, an inner hinge member, and a one-piece housing defining a cavity that houses the outer hinge member and the inner hinge member when the dual gooseneck hinge assembly is in a closed position. The outer hinge member defines a curved body portion and a slotted opening. The curved body portion includes a gooseneck bend and the slotted opening includes a first stopping surface defining a first open position and a second stopping surface defining a second open position of the dual gooseneck hinge assembly. The outer hinge member rotates about a main axis of rotation of the dual gooseneck hinge assembly between the closed position, the first opened position, and the second opened position.

19 Claims, 7 Drawing Sheets

(56) References Cited

U.S. PATENT DOCUMENTS

| | | | | | |
|---|---|---|---|---|---|
| 5,441,167 | A * | 8/1995 | Shigeru | E05D 11/06 | 16/374 |
| 5,685,046 | A * | 11/1997 | Neag | E05D 3/127 | 16/334 |
| 11,214,141 | B2 | 1/2022 | Yagura | | |
| 2009/0106940 | A1* | 4/2009 | Greenbank | E05D 3/127 | 16/367 |
| 2015/0252602 | A1* | 9/2015 | Nielsen | E05D 11/06 | 16/275 |
| 2018/0216379 | A1* | 8/2018 | Spoelstra | E05D 3/14 | |
| 2020/0055389 | A1* | 2/2020 | Herzig | E05D 3/125 | |
| 2020/0173215 | A1* | 6/2020 | Hirama | E05F 1/12 | |
| 2022/0034146 | A1* | 2/2022 | Rudolf | B60K 15/05 | |
| 2022/0186542 | A1* | 6/2022 | Wietkamp | E05F 15/627 | |
| 2023/0358078 | A1* | 11/2023 | Zhang | E05B 17/22 | |
| 2025/0305343 | A1* | 10/2025 | Isogai | B60K 15/05 | |
| 2025/0320759 | A1* | 10/2025 | Choi | E05D 3/125 | |

* cited by examiner

DUAL GOOSENECK HINGE ASSEMBLY FOR A DOOR COVER

INTRODUCTION

The present disclosure relates to a dual gooseneck hinge assembly for a door cover that provides access to an opening defined a body panel.

An electric vehicle is powered by one or more electric motors that draw electricity from a battery pack. The battery pack is charged by an external power supply. The electric vehicle also includes a charge port that allows for the electric vehicle to connect to the external power supply to charge the battery. The electric vehicle also includes a charge port door that rotates between a closed and an opened position. The charge port door protects the charge port from external elements when in the closed position and provides access to the charge port in the opened position.

An individual may charge the electric vehicle at a charging station by opening the charge port door to access the electric vehicle's charge port. When opened, the charge port door is usually positioned about perpendicular with respect to the vehicle. It is to be appreciated that sometimes space may be limited at charging stations. For example, public charging stations, which are found in places such as retail shopping centers and parking lots, often have limited space between two parked electric vehicles. As a result, when an individual opens the charge port door, there may be a lack of clearance if the individual's vehicle is parked directly adjacent to another vehicle.

In one approach to address the issue of limited clearance, a gooseneck hinge is provided for mounting the charge port door to the vehicle. The gooseneck hinge includes a gooseneck strap having a curved profile that is shaped similar to the bend found in a goose's neck. However, a gooseneck hinge is only capable of providing a one-dimensional range of motion, which may result in an individual finding it inconvenient to open the charge port door in relatively narrow spaces. Another solution to address the issue of limited clearance is to provide a 4-bar link hinge, which includes four interlocking arms and an actuator, for mounting the charge port door to the vehicle. However, the four interlocking arms and the actuator of the 4-bar hinge increase the size, packaging, and weight of the charge port door assembly.

Thus, while charge port doors achieve their intended purpose, there is a need in the art for an improved approach for increasing the range of rotation of a charge port door for an electric vehicle.

SUMMARY

According to several aspects, a dual gooseneck hinge assembly for a door cover that provides access to an opening defined by a body panel is disclosed. The dual gooseneck hinge assembly includes an outer hinge member defining a slotted opening including a first stopping surface defining a first open position and a second stopping surface defining a second open position of the dual gooseneck hinge assembly. The outer hinge member rotates about a main axis of rotation of the dual gooseneck hinge assembly between a closed position, the first opened position, and the second opened position. The dual gooseneck hinge assembly includes an inner hinge member defining a floating proximate end portion including a stopper member, a rotatable distal end portion, and an engagement member. The engagement member abuts against the first stopping surface of the slotted opening of the outer hinge member when the dual gooseneck hinge assembly is in the first opened position and the second stopping surface when the dual gooseneck hinge assembly is in the second opened position, the rotatable distal end portion of the inner hinge member is rotatably connected to the door cover at a minor axis of rotation of the dual gooseneck hinge assembly, and the inner hinge member rotates about the minor axis of rotation between the first open position and the second open position. The dual gooseneck hinge assembly also includes a one-piece housing defining a cavity that houses the outer hinge member and the inner hinge member when the dual gooseneck hinge assembly is in the closed position, where an engagement surface is disposed along an opening of the cavity of the one-piece housing, and where the outer hinge member rotates about the main axis of rotation of the dual gooseneck hinge assembly from the closed position until the stopper member of the inner hinge member abuts against the engagement surface to retain the inner hinge member of the dual gooseneck hinge assembly in the first opened position.

In another aspect, an angle measured between an inner surface of the door cover and the body panel increases as the dual gooseneck hinge assembly rotates from the first opened position into the second opened position.

In yet another aspect, the slotted opening of the outer hinge member defines a profile including two opposing lateral sides that are connected to one another by the first stopping surface and the second stopping surface.

In an aspect, an increase in the angle as the dual gooseneck hinge assembly rotates from the first opened position to the second opened position is based on a length of the opposing lateral sides of the slotted opening of the outer hinge member.

In another aspect, the outer hinge member includes a proximate end portion, a distal end portion, and a curved body portion of the outer hinge member that connects the proximate end portion to the distal end portion of the outer hinge member.

In yet another aspect, the main axis of rotation is located at the proximate end portion of the outer hinge member and within the cavity defined by the one-piece housing.

In an aspect, the distal end portion of the outer hinge member is rotatably mounted to an inner surface of the door cover.

In another aspect, the curved body portion of the outer hinge member includes a gooseneck bend.

In yet another aspect, the gooseneck bend of the curved body portion of the outer hinge member is a reverse turn that is shaped to orient the proximate end portion of the outer hinge member in the same direction as the distal end portion of the outer hinge member.

In an aspect, the stopper member is a bend that defines an edge surface.

In another aspect, the edge surface of the stopper member abuts against the engagement surface of the one-piece housing to retain the inner hinge member of the dual gooseneck hinge assembly in the first opened position.

In an aspect, a door assembly is disclosed and includes a body panel defining an opening, a door cover that provides access to the opening defined by the body panel, and a dual gooseneck hinge assembly that rotatably mounts the door cover to the body panel. The dual gooseneck hinge assembly includes an outer hinge member defining a curved body portion and a slotted opening. The curved body portion includes a gooseneck bend and the slotted opening includes a first stopping surface defining a first open position and a second stopping surface defining a second open position of the dual gooseneck hinge assembly. The outer hinge member rotates about a main axis of rotation of the dual gooseneck hinge assembly between a closed position, the first opened position, and the second opened position. The dual gooseneck hinge assembly includes an inner hinge member defining a floating proximate end portion including a stopper member, a rotatable distal end portion, and an engagement member. The engagement member abuts against the first stopping surface of the slotted opening of the outer hinge member when the dual gooseneck hinge assembly is in the first opened position and the second stopping surface when the dual gooseneck hinge assembly is in the second opened position. The rotatable distal end portion of the inner hinge member is rotatably connected to the door cover at a minor axis of rotation of the dual gooseneck hinge assembly, and the inner hinge member rotates about the minor axis of rotation between the first open position and the second open position. The dual gooseneck hinge assembly also includes a one-piece housing defining a cavity that houses the outer hinge member and the inner hinge member when the dual gooseneck hinge assembly is in the closed position. An engagement surface is disposed along an opening of the cavity of the one-piece housing. The outer hinge member rotates about the main axis of rotation of the dual gooseneck hinge assembly from the closed position until the stopper member of the inner hinge member abuts against the engagement surface to retain the inner hinge member of the dual gooseneck hinge assembly in the first opened position.

In another aspect, an angle measured between an inner surface of the door cover and the body panel increases as the dual gooseneck hinge assembly rotates from the first opened position into the second opened position.

In yet another aspect, the slotted opening of the outer hinge member defines a profile including two opposing lateral sides that are connected to one another by the first stopping surface and the second stopping surface.

In an aspect, an increase in the angle as the dual gooseneck hinge assembly rotates from the first opened position to the second opened position is based on a length of the opposing lateral sides of the slotted opening of the outer hinge member.

In another aspect, the outer hinge member includes a proximate end portion and a distal end portion and the curved body portion of the outer hinge member connects the proximate end portion to the distal end portion of the outer hinge member.

In yet another aspect, the main axis of rotation is located at the proximate end portion of the outer hinge member and within the cavity of the one-piece housing.

In an aspect, the distal end portion of the outer hinge member is rotatably mounted to an inner surface of the door cover.

In another aspect, the gooseneck bend of the curved body portion of the outer hinge member is a reverse turn that is shaped to orient the proximate end portion of the outer hinge member in the same direction as the distal end portion of the outer hinge member.

In an aspect, a door assembly includes a body panel defining an opening, a door cover that provides access to the opening defined by the body panel, and a dual gooseneck hinge assembly that rotatably mounts the door cover to the body panel. The dual gooseneck hinge assembly includes an outer hinge member defining a curved body portion and a slotted opening. The curved body portion includes a gooseneck bend and the slotted opening includes a first stopping surface defining a first open position and a second stopping surface defining a second open position of the dual gooseneck hinge assembly. The outer hinge member rotates about a main axis of rotation of the dual gooseneck hinge assembly between a closed position, the first opened position, and the second opened position, and wherein an angle measured between an inner surface of the door cover and the body panel increases as the dual gooseneck hinge assembly rotates from the first opened position into the second opened position. The dual gooseneck hinge assembly includes an inner hinge member defining a floating proximate end portion including a stopper member, a rotatable distal end portion, and an engagement member. The engagement member abuts against the first stopping surface of the slotted opening of the outer hinge member when the dual gooseneck hinge assembly is in the first opened position and the second stopping surface when the dual gooseneck hinge assembly is in the second opened position, the rotatable distal end portion of the inner hinge member is rotatably connected to the door cover at a minor axis of rotation of the dual gooseneck hinge assembly, and the inner hinge member rotates about the minor axis of rotation between the first open position and the second open position. The dual gooseneck hinge assembly a one-piece housing defining a cavity that houses the outer hinge member and the inner hinge member when the dual gooseneck hinge assembly is in the closed position. An engagement surface is disposed along an opening of the cavity of the one-piece housing. The outer hinge member rotates about the main axis of rotation of the dual gooseneck hinge assembly from the closed position until the stopper member of the inner hinge member abuts against the engagement surface to retain the inner hinge member of the dual gooseneck hinge assembly in the first opened position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1A:
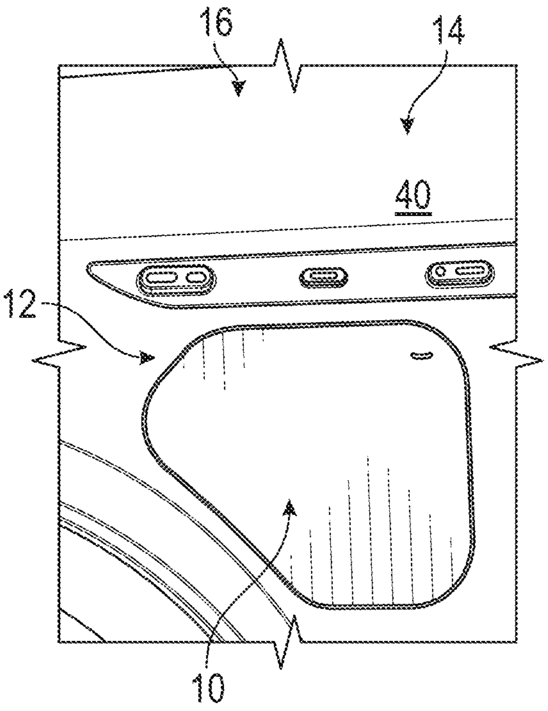
FIG. 1A is a side view of a door cover for a charge port of an electric vehicle, where the door cover is in a closed position, according to an exemplary embodiment.
Figure 1B:
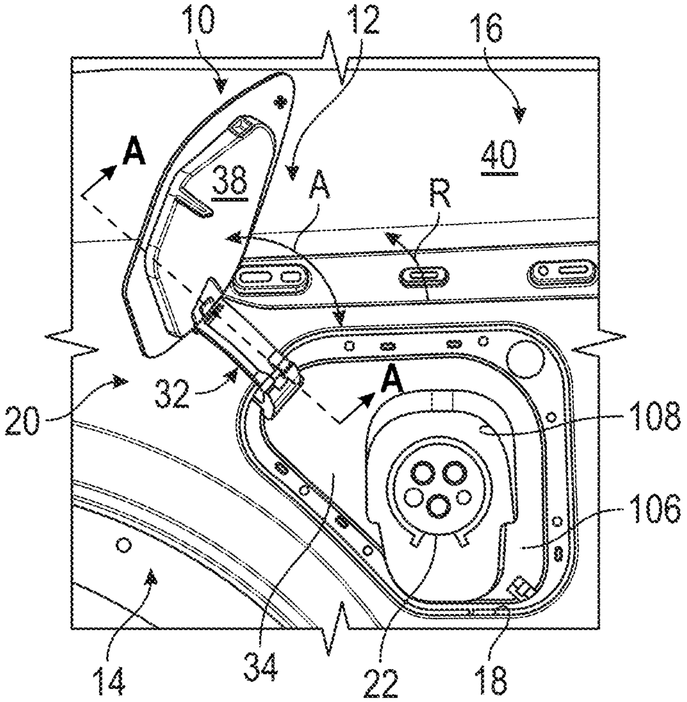
FIG. 1B illustrates the door cover shown in FIG. 1A, where a dual gooseneck hinge assembly that rotatably mounts the door cover to the electric vehicle is visible and the door cover is in a first opened position to reveal the charge port, according to an exemplary embodiment.
Figure 1C:
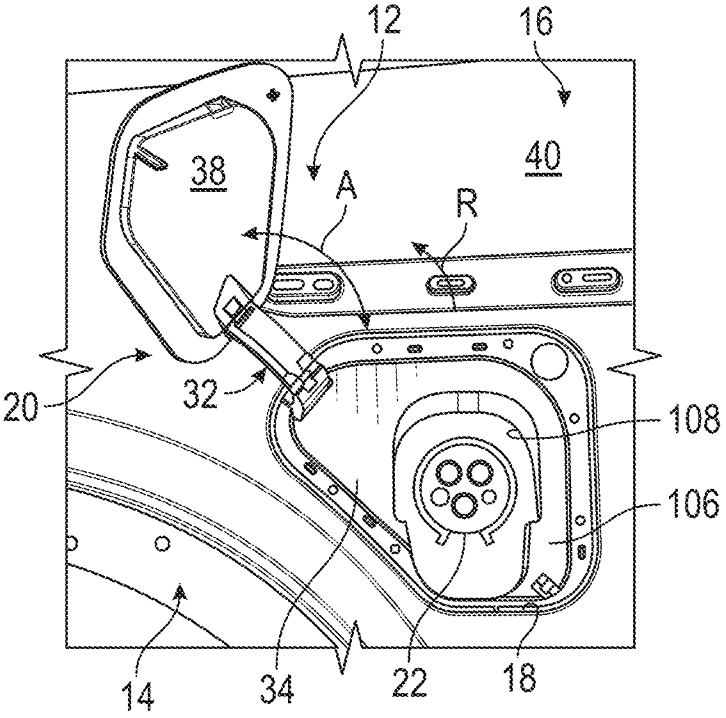
FIG. 1C illustrates the door cover and the dual gooseneck hinge assembly shown in FIG. 1B in a second opened position, according to an exemplary embodiment.

Referring to FIGS. 1A-1C, an exemplary door cover 10 that is part of a door assembly 12 for an electric vehicle 14 is illustrated. Specifically, FIG. 1A illustrates the door cover 10 in a closed position, FIG. 1B illustrates the door cover 10 in a first opened position, and FIG. 1C illustrates the door cover 10 in a second opened position. Referring specifically to FIG. 1A, the door cover 10 is flush with respect to a body panel 16 of the when in the closed position. Referring to FIGS. 1B and 1C, the door cover 10 is rotated between the closed position and the first opened position, and between the first open position and the second opened position by a dual gooseneck hinge assembly 20 that is part of the door assembly 12. As seen in FIGS. 1B and 1C, the door cover 10 provides access to an opening 18 defined by the body panel 16 of the electric vehicle 14.

In the non-limiting embodiment as shown in the figures, the opening 18 defined by the body panel 16 provides access to a charge port 22 of the electric vehicle 14. The dual gooseneck hinge assembly 20 rotatably mounts the door cover 10 to the body panel 16 of the electric vehicle 14. The dual gooseneck hinge assembly 20 includes an inner hinge member 30 (visible in FIG. 3), an outer hinge member 32 (visible in FIGS. 1B and 1C, and a one-piece housing 34 (visible in FIGS. 1B, 1C, and 3). Although the figures illustrate the dual gooseneck hinge assembly 20 providing access to a charge port 22 of an electric vehicle 14, it is to be appreciated that the dual gooseneck hinge assembly 20 is not limited to an electric vehicle may be used in other applications as well. For example, the dual gooseneck hinge assembly 20 may be used in other types of access doors such as, but not limited to, a fuel access door for a vehicle.

Referring specifically to FIG. 1B, when in the dual gooseneck hinge assembly 20 is in the first opened position, the door cover 10 is positioned at an angle A measured between an inner surface 38 of the door cover 10 and an inner surface 40 of the body panel 16 of the electric vehicle 14. In one non-limiting embodiment, the door cover 10 is positioned perpendicular with respect to the body panel 16 defining the opening 18. Although ninety degrees is described, it is to be appreciated that the angle A is not limited to this dimension. Referring to FIG. 1C, as the door cover 10 rotates about a main axis of rotation 42 (shown in FIG. 3) from the first opened position to the second opened position, the angle A measured between the door cover 10 and the body panel 16 of the electric vehicle 14 increases. It is to be appreciated that increasing the angle A measured between the door cover 10 and the body panel 16 between the first opened position and the second opened position results in less space required between the electric vehicle 14 and an adjacent vehicle. Requiring less space between vehicles may be especially helpful when an individual opens the door cover 10 to access the charge port 22 when there is a lack of clearance between the electric vehicle 14 and another another vehicle parked directly adjacent to the electric vehicle 14 during charging.

Figure 2:
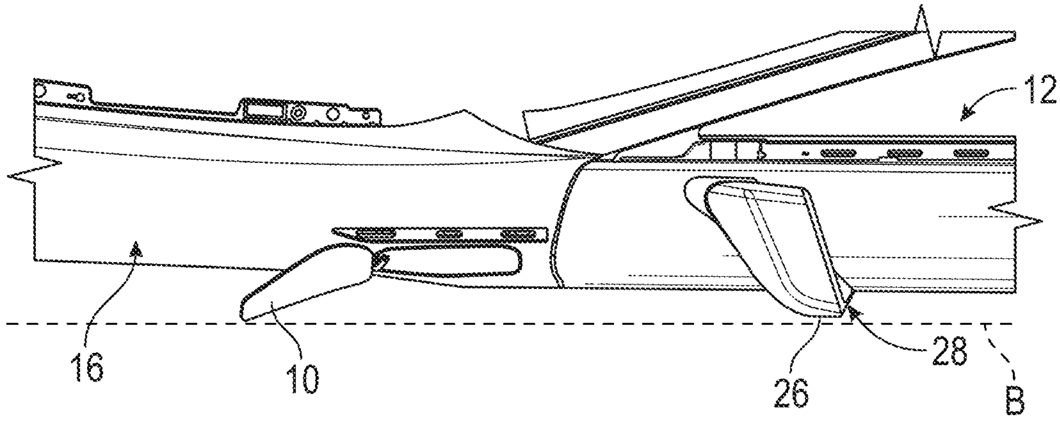
FIG. 2 is a top view of the electric vehicle where the door cover is in the second opened position, according to an exemplary embodiment.

FIG. 2 is a top view of the electric vehicle 14 when the door cover 10 is in the second opened position. As seen in FIG. 2, when in the second opened position, the door cover 10 may be positioned completely within a boundary B (shown in dashed line). The boundary B is a straight line that extends in the fore-aft direction along the electric vehicle 14. The boundary B represents the position of the outermost surface 26 of an outside rearview mirror 28 of the electric vehicle 14, where the outermost surface 26 of the outside rearview mirror 28 is oriented in the cross-car direction.

Figure 3:
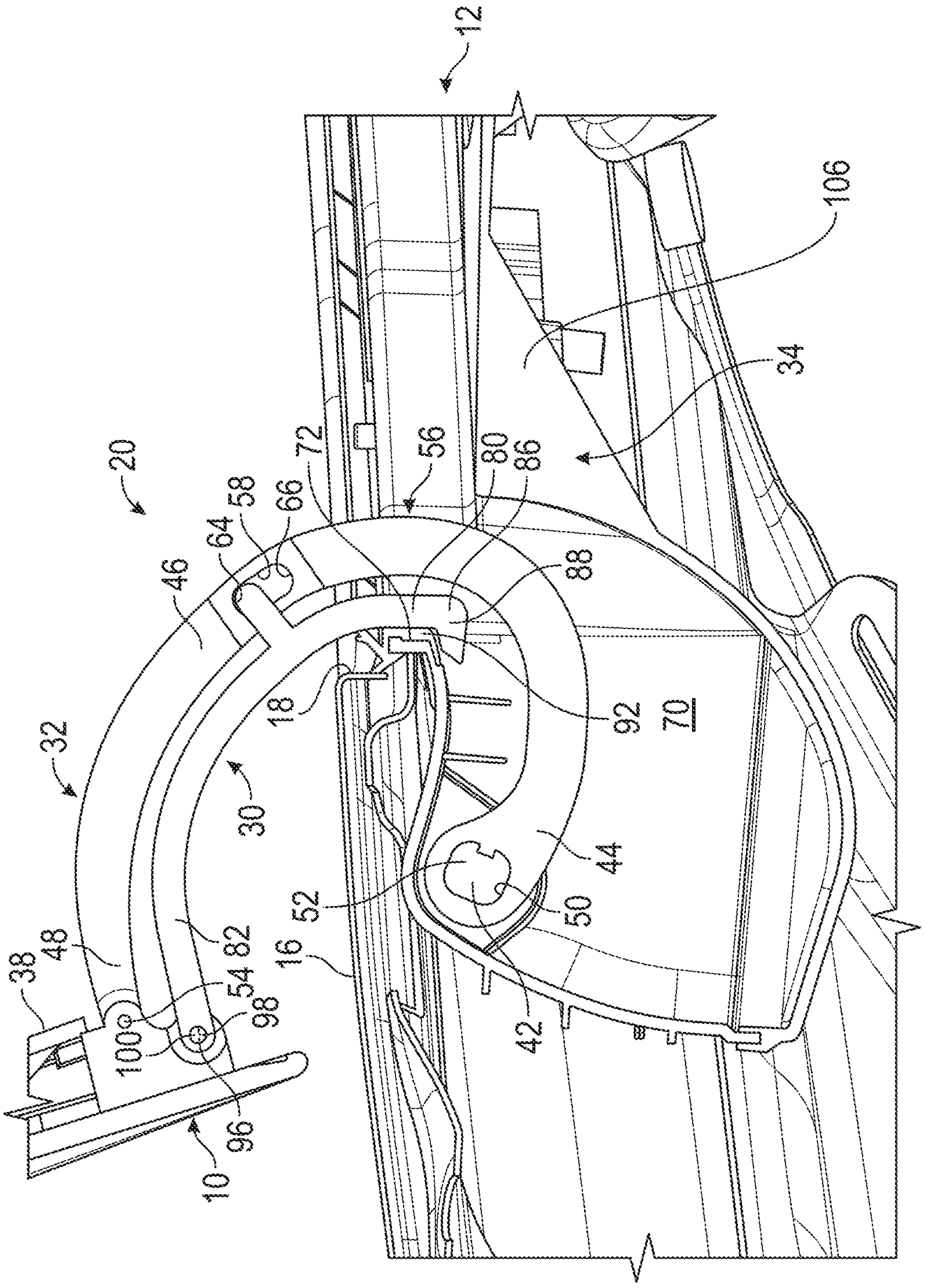
FIG. 3 is a top, cross-sectioned view of the door cover and the dual gooseneck hinge assembly taken at section line A-A in FIG. 1B, according to an exemplary embodiment.

FIG. 3 is a top, cross-sectioned view of the door cover 10 and the dual gooseneck hinge assembly 20 taken at section line A-A in FIG. 1B, where the dual gooseneck hinge assembly 20 is in the first opened position. Referring to FIGS. 1B and 3, the outer hinge member 32 rotates about the main axis of rotation 42 of the dual gooseneck hinge assembly 20 between the closed position, the first opened position, and the second opened position. The main axis of rotation 42 of the dual gooseneck hinge assembly 20 is located behind the body panel 16 of the electric vehicle 14, within a cavity 70 defined by the one-piece housing 34. The outer hinge member 32 is positioned so as to be visible to a user when the dual gooseneck hinge assembly 20 is in the first opened position (FIG. 1B) and the second opened position (FIG. 1C). However, the inner hinge member 30 is hidden from view by the outer hinge member 32

The outer hinge member 32 defines a proximate end portion 44, a curved body portion 46, and a distal end portion 48, where the curved body portion 46 of the outer hinge member 32 connects the proximate end portion 44 to the distal end portion 48. The main axis of rotation 42 is located at the proximate end portion 44 of the outer hinge member 32. The proximate end portion 44 of the outer hinge member 32 defines an opening 50 at the main axis of rotation 42, where the opening 50 is shaped to receive a pin 52. The distal end portion 48 of the outer hinge member 32 is rotatably mounted to the inner surface 38 of the door cover 10. Specifically, the distal end portion 48 of the outer hinge member 32 defines an opening (not visible in FIG. 3) that is shaped to receive a pin 54, where the distal end portion 48 of the outer hinge member 32 is rotatably mounted to the inner surface 38 of the door cover 10 about the pin 54.

The curved body portion 46 of the outer hinge member 32 includes a gooseneck bend 56. The gooseneck bend 56 of the curved body portion 46 of the outer hinge member 32 is a reverse turn that is shaped to orient the proximate end portion 44 of the outer hinge member 32 in the same direction as the distal end portion 48 of the outer hinge member 32. In the non-limiting embodiment as shown, both the proximate end portion 44 and the distal end portion 48 of the outer hinge member 32 are both oriented towards the left-hand side of the figures.

The curved body portion 46 of the outer hinge member 32 also defines a slotted opening 58. The slotted opening 58 defines a first stopping surface 64 and a second stopping surface 66. The first stopping surface 64 of the slotted opening 58 defines the first opened position of the dual gooseneck hinge assembly 20 and the second stopping surface 66 of the slotted opening 58 defines the second opened position of the dual gooseneck hinge assembly 20. As explained below, an engagement member 84 (FIG. 5) that is part of the inner hinge member 30 is engaged with and travels between the first and second stopping surfaces 64, 66 of the slotted opening 58 of the outer hinge member 32. It is to be appreciated that movement of the engagement member 84 within the slotted opening 58 of the outer hinge member 32 allows for the door cover 10 to rotate between the first open position and the second opened position.

Figure 4C:
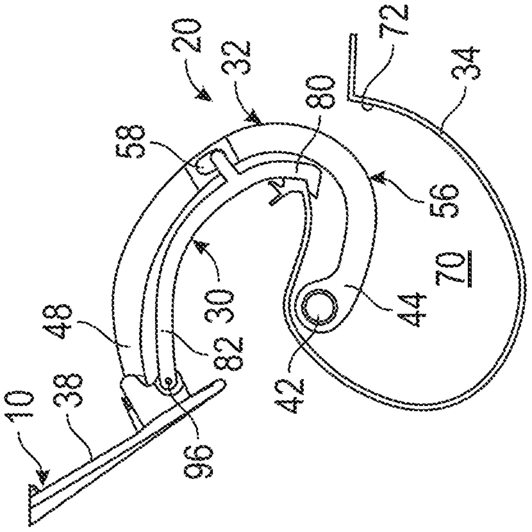
FIG. 4C is a top cross-sectioned view of the dual gooseneck hinge assembly and the door cover in the second opened position, according to an exemplary embodiment.
Figure 4B:
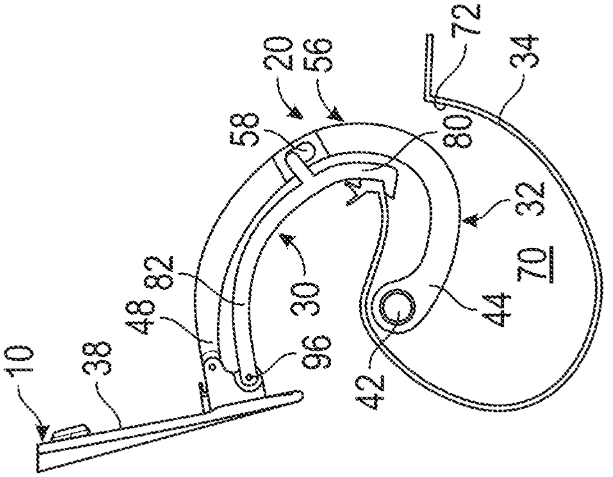
FIG. 4B is a top cross-sectioned view of the dual gooseneck hinge assembly and the door cover in the first opened position, according to an exemplary embodiment.
Figure 4A:
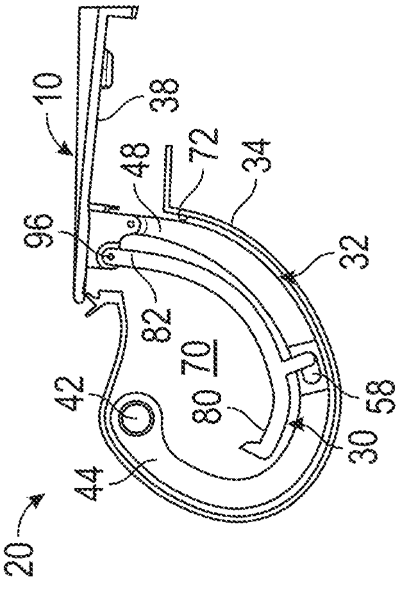
FIG. 4A is a top cross-sectioned view of the dual gooseneck hinge assembly and the door cover in the closed position, according to an exemplary embodiment.

FIG. 4A is a top, cross sectioned view of the dual gooseneck hinge assembly 20 in the closed position, where a portion of the one-piece housing 34 is omitted. FIG. 4B illustrates the dual gooseneck hinge assembly 20 in the first opened position and FIG. 4C illustrates the dual gooseneck hinge assembly 20 in the second opened position. When the dual gooseneck hinge assembly 20 is in the closed position as seen in FIG. 4A, both the inner hinge member 30 and the outer hinge member 32 are both contained completely within or are housed by the cavity 70 defined by the one-piece housing 34. When the dual gooseneck hinge assembly 20 is in the first open position as seen in FIG. 4B, the proximate end portion 44 of the outer hinge member 32 is located within the cavity 70 defined by the one-piece housing 34 while the gooseneck bend 56 extends through an opening 72 of the cavity 70 defined by the one-piece housing 34, and the distal end portion 48 of the outer hinge member 32 extends through the opening 72 of the one-piece housing 34 and is positioned outside of the electric vehicle 14.

Figure 5:
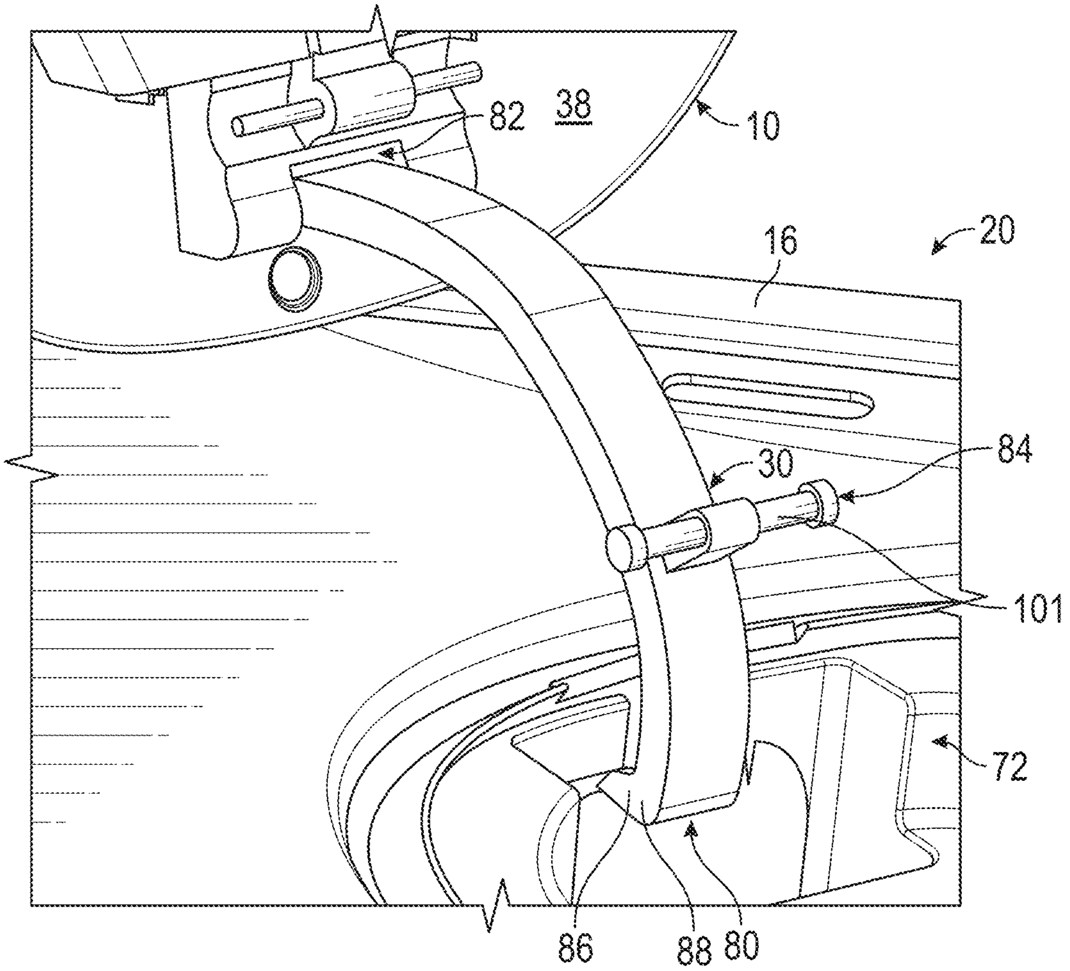
FIG. 5 is a perspective view illustrates the dual gooseneck hinge assembly with an outer hinge member omitted, according to an exemplary embodiment.

FIG. 5 illustrates the dual gooseneck hinge assembly 20, where the outer hinge member 32 has been omitted to reveal the inner hinge member 30 remains. Referring to FIGS. 3, 4B, and 5, the inner hinge member 30 includes a floating proximate end portion 80, a rotatable distal end portion 82, and the engagement member 84 (FIG. 5). As seen in FIG. 4A, the floating proximate end portion 80 of the inner hinge member 30 is free and is not engaged with another component of the dual gooseneck hinge assembly 20 when in the closed position. As seen in FIG. 5, the floating proximate end portion 80 of the inner hinge member 30 includes a stopper member 86.

Figure 6:
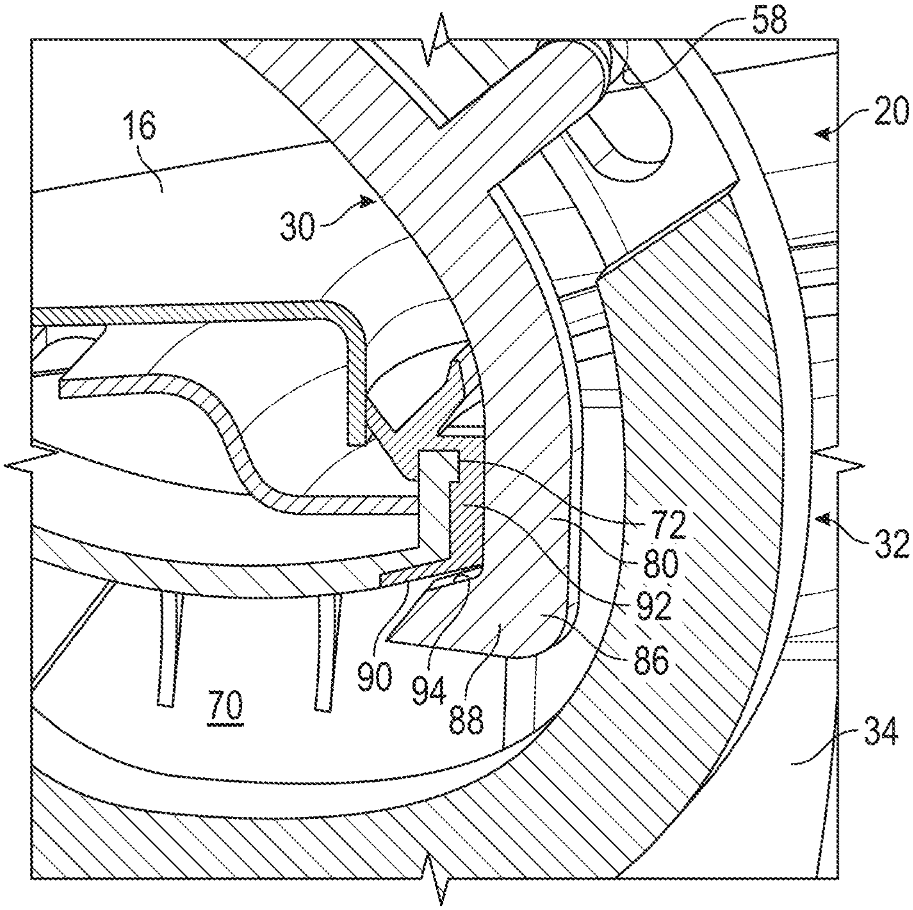
FIG. 6 is an enlarged, cross-sectioned view of the stopper member of an inner hinge member shown in FIG. 3, according to an exemplary embodiment.

FIG. 6 is an enlarged, cross-sectioned view of the stopper member 86 of the inner hinge member 30 shown in FIG. 3. Referring to FIGS. 4A, 4B, 5 and 6, as the door cover 10 is opened from the closed position into the first opened position, the outer hinge member 32 rotates about the main axis of rotation 42 of the dual gooseneck hinge assembly 20 from the closed position until the stopper member 86 disposed at the floating proximate end portion 80 of the inner hinge member 30 contacts and abuts against an engagement surface 90 (FIG. 6) disposed along the opening 72 defined by the one-piece housing 34. In the embodiment as shown in the figures, the stopper member 86 is a bend 88. As seen in FIG. 6, the bend 88 of the stopper member 86 defines an edge surface 94, however, it is to be appreciated that the stopper member 86 may include other geometries that include an edge surface 94 as well. The edge surface 94 of the stopper member 86 is shaped to abut against the engagement surface 90 of the one-piece housing 34.

It is to be appreciated that the abutment between the stopper member 86 and the engagement surface 90 disposed along the opening 72 of the one-piece housing 34 prevents further rotation of of the dual gooseneck hinge assembly 20 about the main axis of rotation 42 (FIG. 3) and retains the inner hinge member 30 of the dual gooseneck hinge assembly 20 in the first opened position. Specifically, as seen in FIG. 6, a lining 92 constructed of a flexible material is disposed around the opening 72 of the cavity 70 defined by the one-piece housing 34, where the lining 92 defines the engagement surface 90. Some examples of the flexible material for the lining include, but are not limited to, an elastomer such as rubber.

Referring to FIGS. 3 and 4A-4C, the rotatable distal end portion 82 of the inner hinge member 30 is rotatably connected to the inner surface 38 of the door cover 10 at a minor axis of rotation 96 of the dual gooseneck hinge assembly 20. Specifically, as seen in FIG. 3, the rotatable distal end portion 82 of the inner hinge member 30 defines an opening 98 at the minor axis of rotation 96, where the opening 98 is shaped to receive a pin 100. The door cover 10 is rotatably mounted to the rotatable distal end portion 82 of the inner hinge member 30 by the pin 100.

Referring to FIGS. 1B-1C, 4B-4C and 6, the inner hinge member 30 rotates about the minor axis of rotation 96 between the first open position and the second open position of the dual gooseneck hinge assembly 20. Specifically, an individual may gain access to the charge port 22 of the electric vehicle 14 (seen in FIGS. 1B-1C) by first positioning the door cover 10 into the first opened position seen in FIGS. 1B and 4B, where the abutment between the abutment between the stopper member 86 and the engagement surface 90 disposed along the opening 72 of the one-piece housing 34 (seen in FIG. 6) retains the dual gooseneck hinge assembly 20 in the first opened position. An individual may then increase the angle A (FIGS. 1B-1C) measured between the door cover 10 the body panel 16 of the electric vehicle 14 by exerting a force upon the door cover 10 in the direction R (FIGS. 1B and 1C) towards the second opened position. As the door cover 10 is urged in the direction R towards the second opened position, the inner hinge member 30 rotates about the minor axis of rotation 96 from the first open position into the second open position of the dual gooseneck hinge assembly 20.

Referring to FIGS. 3 and 5, in one non-limiting embodiment the engagement member 84 (FIG. 5) of the inner hinge member 30 is a pin 101 that is sized to slide within the slotted opening 58 of the outer hinge member 32. When the engagement member 84 abuts against the first stopping surface 64 of the slotted opening 58 of the outer hinge member 32 the dual gooseneck hinge assembly is in the first opened position, and when the engagement member 84 abuts against the second stopping surface 66 of the slotted opening 58 of the outer hinge member 32 the dual gooseneck hinge assembly 20 is in the second opened position. Specifically, it is to be appreciated that the abutment between the second stopping surface 66 of the slotted opening 58 of the outer hinge member 32 and the engagement member 84 retains the dual gooseneck hinge assembly 20 in the second opened position.

Figure 7:
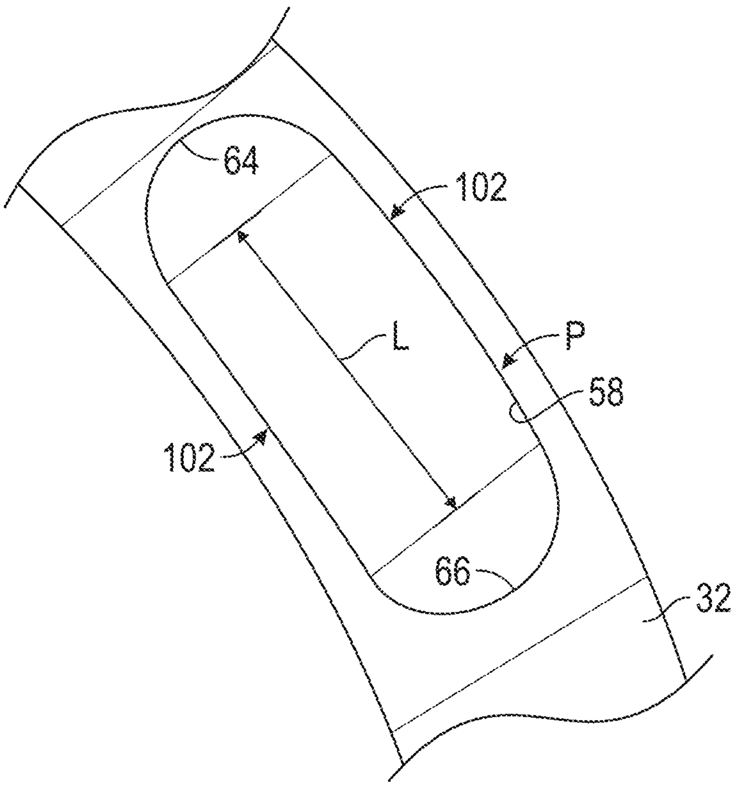
FIG. 7 is an enlarged view of a slotted opening that is part of the outer hinge member shown in FIG. 3, according to an exemplary embodiment.

FIG. 7 is an enlarged view of the slotted opening 58 of the outer hinge member 32. The slotted opening 58 defines a profile P, where the profile P includes two opposing lateral sides 102 that are connected to one another by the first stopping surface 64 and the second stopping surface 66. Referring to FIGS. 1B, 1C, and 7, as the door cover 10 rotates about the main axis of rotation 42 (shown in FIG. 3) from the first opened position to the second opened position, the angle A measured between the door cover 10 and the body panel 16 of the electric vehicle 14 increases. It is to be appreciated that an increase in the angle A between the door cover 10 and the body panel 16 as the door cover 10 rotates from the first opened position to the second opened position is based on a length L of the opposing lateral sides 102 of the slotted opening 58 of the outer hinge member 32. Increasing the length L of the opposing lateral sides 102 of the slotted opening 58 results in a greater increase in the angle A as the door cover 10 rotates about the main axis of rotation 42 between the first opened position and the second open position. Similarly, decreasing the length L of the opposing lateral sides 102 of the slotted opening 58 reduces the increase in the angle A as the door cover 10 rotates about the main axis of rotation 42 between the first opened position and the second opened position.

Referring to FIGS. 1B, 1C, and 3, the one-piece housing 34 defines a frame section 106, where a portion of the frame section 106 is visible in FIG. 3. The frame section 106 of the one-piece housing 34 defines an opening 108 (FIGS. 1B and 1C), where the charge port 22 of the electric vehicle 14 is visible through the opening 108 of the one-piece housing 34. Although the figures illustrate the one-piece housing 34 as an integral part that includes the cavity 70 that houses the hinge members 30, 32 as well as the frame section 106, it is to be appreciated that in embodiments the frame section 106 may be a separate component.

Referring generally to the figures, the disclosed dual gooseneck hinge assembly provides various technical effects and benefits. Specifically, the dual gooseneck hinge assembly provides an approach to increase the angle measured between the inner surface of the door cover and the body panel of an electric vehicle as the dual gooseneck hinge assembly rotates from the first opened position to the second opened position, which results in less space required between the electric vehicle and an adjacent vehicle. Requiring less space may be especially helpful when an individual opens the door cover to access the charge port when there is only limited clearance between the electric vehicle and another another vehicle parked directly adjacent to the electric vehicle during charging.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A dual gooseneck hinge assembly for a door cover that provides access to an opening defined by a body panel, the dual gooseneck hinge assembly comprising:

an outer hinge member defining a slotted opening including a first stopping surface defining a first open position and a second stopping surface defining a second open position of the dual gooseneck hinge assembly, wherein the outer hinge member rotates about a main axis of rotation of the dual gooseneck hinge assembly between a closed position, the first opened position, and the second opened position;

an inner hinge member defining a floating proximate end portion including a stopper member, a rotatable distal end portion, and an engagement member, wherein the engagement member abuts against the first stopping surface of the slotted opening of the outer hinge member when the dual gooseneck hinge assembly is in the first opened position and the second stopping surface when the dual gooseneck hinge assembly is in the second opened position, the rotatable distal end portion of the inner hinge member is rotatably connected to the door cover at a minor axis of rotation of the dual gooseneck hinge assembly, and the inner hinge member rotates about the minor axis of rotation between the first open position and the second open position; and a one-piece housing defining a cavity that houses the outer hinge member and the inner hinge member when the dual gooseneck hinge assembly is in the closed position, wherein an engagement surface is disposed along an opening of the cavity of the one-piece housing, and wherein the outer hinge member rotates about the main axis of rotation of the dual gooseneck hinge assembly from the closed position until the stopper member of the inner hinge member abuts against the engagement surface to retain the inner hinge member of the dual gooseneck hinge assembly in the first opened position.

2. The dual gooseneck hinge assembly of claim 1, wherein an angle measured between an inner surface of the door cover and the body panel increases as the dual gooseneck hinge assembly rotates from the first opened position into the second opened position.

3. The dual gooseneck hinge assembly of claim 2, wherein the slotted opening of the outer hinge member defines a profile including two opposing lateral sides that are connected to one another by the first stopping surface and the second stopping surface.

4. The dual gooseneck hinge assembly of claim 3, wherein an increase in the angle as the dual gooseneck hinge assembly rotates from the first opened position to the second opened position is based on a length of the opposing lateral sides of the slotted opening of the outer hinge member.

5. The dual gooseneck hinge assembly of claim 1, wherein the outer hinge member includes a proximate end portion, a distal end portion, and a curved body portion of the outer hinge member that connects the proximate end portion to the distal end portion of the outer hinge member.

6. The dual gooseneck hinge assembly of claim 5, wherein the main axis of rotation is located at the proximate end portion of the outer hinge member and within the cavity defined by the one-piece housing.

7. The dual gooseneck hinge assembly of claim 5, wherein the distal end portion of the outer hinge member is rotatably mounted to an inner surface of the door cover.

8. The Dual gooseneck hinge assembly of claim 5, wherein the curve of the curved body portion is a reverse turn that is shaped to orient the proximate end portion of the outer hinge member in the same direction as the distal end portion of the outer hinge member.

9. The dual gooseneck hinge assembly of claim 1, wherein the stopper member is a bend that defines an edge surface.

10. The dual gooseneck hinge assembly of claim 9, wherein the edge surface of the stopper member abuts against the engagement surface of the one-piece housing to retain the inner hinge member of the dual gooseneck hinge assembly in the first opened position.

11. A door assembly, comprising:

a body panel defining an opening;

a door cover that provides access to the opening defined by the body panel; and a dual gooseneck hinge assembly that rotatably mounts the door cover to the body panel, wherein the dual gooseneck hinge assembly comprises:

an outer hinge member defining a curved body portion and a slotted opening, the slotted opening includes a first stopping surface defining a first open position and a second stopping surface defining a second open position of the dual gooseneck hinge assembly, wherein the outer hinge member rotates about a main axis of rotation of the dual gooseneck hinge assembly between a closed position, the first opened position, and the second opened position;

an inner hinge member defining a floating proximate end portion including a stopper member, a rotatable distal end portion, and an engagement member, wherein the engagement member abuts against the first stopping surface of the slotted opening of the outer hinge member when the dual gooseneck hinge assembly is in the first opened position and the second stopping surface when the dual gooseneck hinge assembly is in the second opened position, the rotatable distal end portion of the inner hinge member is rotatably connected to the door cover at a minor axis of rotation of the dual gooseneck hinge assembly, and the inner hinge member rotates about the minor axis of rotation between the first open position and the second open position; and a one-piece housing defining a cavity that houses the outer hinge member and the inner hinge member when the dual gooseneck hinge assembly is in the closed position, wherein an engagement surface is disposed along an opening of the cavity of the one-piece housing, and wherein the outer hinge member rotates about the main axis of rotation of the dual gooseneck hinge assembly from the closed position until the stopper member of the inner hinge member abuts against the engagement surface to retain the inner hinge member of the dual gooseneck hinge assembly in the first opened position.

12. The dual gooseneck hinge assembly of claim 11, wherein an angle measured between an inner surface of the door cover and the body panel increases as the dual gooseneck hinge assembly rotates from the first opened position into the second opened position.

13. The dual gooseneck hinge assembly of claim 12, wherein the slotted opening of the outer hinge member defines a profile including two opposing lateral sides that are connected to one another by the first stopping surface and the second stopping surface.

14. The dual gooseneck hinge assembly of claim 13, wherein an increase in the angle as the dual gooseneck hinge assembly rotates from the first opened position to the second opened position is based on a length of the opposing lateral sides of the slotted opening of the outer hinge member.

15. The dual gooseneck hinge assembly of claim 11, wherein the outer hinge member includes a proximate end portion and a distal end portion and the curved body portion of the outer hinge member connects the proximate end portion to the distal end portion of the outer hinge member.

16. The dual gooseneck hinge assembly of claim 15, wherein the main axis of rotation is located at the proximate end portion of the outer hinge member and within the cavity of the one-piece housing.

17. The dual gooseneck hinge assembly of claim 15, wherein the distal end portion of the outer hinge member is rotatably mounted to an inner surface of the door cover.

18. The dual gooseneck hinge assembly of claim 16, wherein the curve of the curved body portion is a reverse turn that is shaped to orient the proximate end portion of the outer hinge member in the same direction as the distal end portion of the outer hinge member.

19. An electric vehicle including a door assembly, the door assembly comprising:

a body panel defining an opening;

a door cover that provides access to the opening defined by the body panel; and a dual gooseneck hinge assembly that rotatably mounts the door cover to the body panel, wherein the dual gooseneck hinge assembly comprises:

an outer hinge member defining a curved body portion and a slotted opening, wherein the curved body portion includes a gooseneck bend and the slotted opening includes a first stopping surface defining a first open position and a second stopping surface defining a second open position of the dual gooseneck hinge assembly, wherein the outer hinge member rotates about a main axis of rotation of the dual gooseneck hinge assembly between a closed position, the first opened position, and the second opened position, and wherein an angle measured between an inner surface of the door cover and the body panel increases as the dual gooseneck hinge assembly rotates from the first opened position into the second opened position;

an inner hinge member defining a floating proximate end portion including a stopper member, a rotatable distal end portion, and an engagement member, wherein the engagement member abuts against the first stopping surface of the slotted opening of the outer hinge member when the dual gooseneck hinge assembly is in the first opened position and the second stopping surface when the dual gooseneck hinge assembly is in the second opened position, the rotatable distal end portion of the inner hinge member is rotatably connected to the door cover at a minor axis of rotation of the dual gooseneck hinge assembly, and the inner hinge member rotates about the minor axis of rotation between the first open position and the second open position; and a one-piece housing defining a cavity that houses the outer hinge member and the inner hinge member when the dual gooseneck hinge assembly is in the closed position, wherein an engagement surface is disposed along an opening of the cavity of the one-piece housing, and wherein the outer hinge member rotates about the main axis of rotation of the dual gooseneck hinge assembly from the closed position until the stopper member of the inner hinge member abuts against the engagement surface to retain the inner hinge member of the dual gooseneck hinge assembly in the first opened position.

* * * * *